United States Patent
Opincariu et al.

(10) Patent No.: US 12,277,134 B1
(45) Date of Patent: Apr. 15, 2025

(54) FEDERATED EXECUTION OF DATA LAKE PROCESSES

(71) Applicant: Amazon Technologies, Inc., Seattle, WA (US)

(72) Inventors: Daniel Opincariu, Redmond, WA (US); Rajasuba Subramanian, Seattle, WA (US); Arnab Dutta, Campbell, CA (US); Deepan Chakravarthy Vijayarangam, Vancouver (CA); Ranil Pavithran Muzhangathu, South Lyon, MI (US); Anas Fattahi, Dearborn, MI (US)

(73) Assignee: Amazon Technologies, Inc., Seattle, WA (US)

( * ) Notice: Subject to any disclaimer, the term of this patent is extended or adjusted under 35 U.S.C. 154(b) by 19 days.

(21) Appl. No.: 18/478,274

(22) Filed: Sep. 29, 2023

(51) Int. Cl.
    *G06F 16/20*     (2019.01)
    *G06F 16/25*     (2019.01)

(52) U.S. Cl.
    CPC .......... *G06F 16/254* (2019.01); *G06F 16/256* (2019.01)

(58) Field of Classification Search
    None
    See application file for complete search history.

(56) References Cited

U.S. PATENT DOCUMENTS

2013/0268258 A1* 10/2013 Patrudu .................. G06F 40/40
    704/9

* cited by examiner

*Primary Examiner* — Belix M Ortiz Ditren
(74) *Attorney, Agent, or Firm* — Knobbe, Martens, Olson & Bear, LLP

(57) ABSTRACT

In a data lake, a control data object is defined. The control object defines the processes and relationships of processes associated with a data set in the data lake. The control has states that are tied to and adapt in response to state changes of the associated data set. A control can have a control type. The system automatically carries forward enabled processes from one data set version to the next data set version. The system uses the control definition to execute processes, such as compaction or data quality scans, on data sets in the data lake.

20 Claims, 7 Drawing Sheets

312

| Dataset version lifecycle | LifecycleState changes | Dataset Version upgrades | Dataset Revision upgrades |
|---|---|---|---|
| UNRELEASED | ACTIVE (upon owner decision) | Copy from prior ACTIVE version (upon owner decision) | No change unless a key (or customer_id) column is changing |
| ACTIVE | ACTIVE | Copy from prior ACTIVE version | No change unless a key (or customer_id) column is changing |
| DEPRECATED | ACTIVE | ACTIVE | No change unless a key (or customer_id) column is changing |
| ARCHIVED | PAUSED | PAUSED | PAUSED |
| DELETED | DELETED | DELETED | DELETED |

314

| Dataset version lifecycle | LifecycleState changes | Dataset Version upgrades | Dataset Revision upgrades |
|---|---|---|---|
| UNRELEASED | UNRELEASED | UNRELEASED | UNRELEASED |
| ACTIVE | ACTIVE | Move from prior ACTIVE version | Move from prior ACTIVE version |
| DEPRECATED | PAUSED | PAUSED | PAUSED |
| ARCHIVED | PAUSED | PAUSED | PAUSED |
| DELETED | DELETED | DELETED | DELETED |

*FIG. 3B*

Table 316:

| A | B | C | D |
|---|---|---|---|
| Dataset version lifecycle | LifecycleState changes | Dataset Version upgrades | Dataset Revision upgrades |
| UNRELEASED | ACTIVE (upon owner decision) | Copy from prior ACTIVE version (upon owner decision) | ACTIVE |
| ACTIVE | ACTIVE | Copy from prior ACTIVE version | ACTIVE |
| DEPRECATED | ACTIVE | ACTIVE | AVAILABLE |
| ARCHIVED | PAUSED | PAUSED | PAUSED |
| DELETED | DELETED | DELETED | DELETED |

Table 318:

| A | B | C | D |
|---|---|---|---|
| Dataset version lifecycle | LifecycleState changes | Dataset Version upgrades | Dataset Revision upgrades |
| UNRELEASED | UNRELEASED | Not applicable | UNRELEASED |
| ACTIVE | ACTIVE | Move from prior ACTIVE version | UNRELEASED |
| DEPRECATED | PAUSED | PAUSED | PAUSED |
| ARCHIVED | PAUSED | PAUSED | PAUSED |
| DELETED | DELETED | DELETED | DELETED |

*FIG. 3C*

FEDERATED EXECUTION OF DATA LAKE PROCESSES

BACKGROUND

A data lake can refer to a centralized repository and/or system that stores structured and/or unstructured data. Data stored in the data lake can typically be stored in a raw format. A large data lake can contain exabytes of data in hundreds of thousands of data sets across thousands of groups, such as different development teams and/or data producers. Millions of process can run against the data lake per day. For a particular group, if and when a data set changes (such as the data set's state changing from unreleased to active or the underlying configuration of the data set changing), then the behavior of the process(es) associated with the data set typically has to be programmed by the team managing the data set, which can be one-off implementations.

BRIEF DESCRIPTION OF THE DRAWINGS

These and other features, aspects, and advantages are described below with reference to the drawings, which are intended for illustrative purposes and should in no way be interpreted as limiting the scope of the embodiments. Furthermore, various features of different disclosed embodiments can be combined to form additional embodiments, which are part of this disclosure. In the drawings, like reference characters can denote corresponding features throughout similar embodiments. The following is a brief description of each of the drawings.

FIGS. 3B-3C depict the configurability of data set controls with respect to changes in data set state.

DETAILED DESCRIPTION

Figure 1:
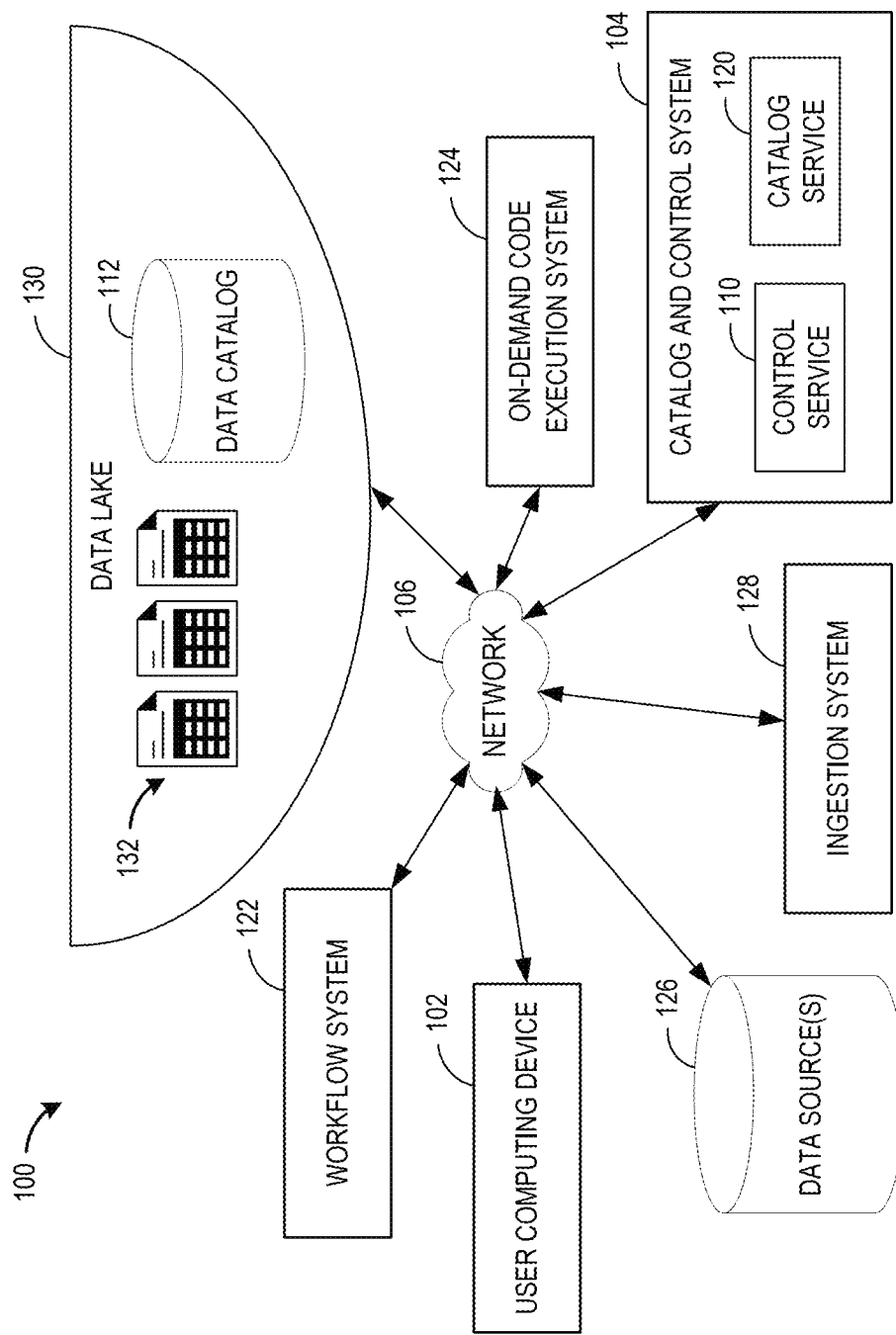
FIG. 1 is a schematic block diagram depicting an illustrative network environment for federated execution of process in a data lake.

As described above, a data lake can have a large number of processes executed on a regular basis from a wide variety of groups. If a data set in the data lake needs to be deprecated or deleted, it can be technically challenging to determine what processes that rely or operate on the data set would be affected. In some existing systems, a developer would be required to review source code to determine what would happen to related processes if a data set was deprecated or deleted. In another case, if a new data set is to be created, multiple processes in a workflow would have to be configured and linked to the new data set. In those existing systems, the maintenance of data set related processes results in very similar, often duplicative work, but that is spread across many different disparate groups. Every new major version or revision of a data set had to be handled as a one-off implementation, which resulted in lack of consistency/visibility and increased operational cost and maintenance efforts. Moreover, each data producer would be responsible for building their own solutions to solve completeness, security, privacy, compliance, and/or quality issues related to data sets, including creating their own point to point service integrations across the data lake.

Generally described, aspects of the present disclosure are directed to federated execution of processes on data sets in a data lake. In particular, a data object, a control, can be created that defines the processes and relationships of processes associated with a data set. The control can have states that are tied to and adapt in response to state changes of the associated data set. A control can have a control type such that multiple groups can reuse the same control pattern, thereby reducing duplicative work. There can be different control type configurations such that, depending on the particular requirements, one control can have different behavior than another control with respect to state changes. Moreover, the controls and control types themselves can be stored in the data catalog of the data lake. By automatically carrying forward enabled processes from one data set version to the next data set version, the need for manual intervention in configuring and enabling processes for each data set version can be eliminated. The systems and methods described herein can ensure that processes operate in a coordinated manner with respective data set versions, effortlessly adapting to the creation of new data set versions in the data lake. This standardized approach can enhance the execution of processes on data sets within the data lake, thereby promoting efficiency and/or consistency.

The systems and methods described herein may improve data lake technology. As described herein, in a data lake context, it can be technically challenging to create new processes/data sets and/or update existing processes in a data lake. Developer teams are typically responsible for building their own one-off solutions to solve completeness, security, privacy, compliance, and/or quality issues related to data sets. Existing approaches to modifying the data lake can require significant work to create the integrations and source code to get the modifications to work successfully. By providing a framework for controls on related processes and data sets, the need for significant amounts of manual configuration on the processes for each data set and data set version can be eliminated. Moreover, the framework can allow the controls on related processes to automatically update in response to state changes of the associated data sets. Therefore, the systems and methods described herein can improve the technology to update and maintain data sets and data processes in a data lake.

The systems and methods described herein may improve computer performance. Compaction can refer to the process of combining smaller files into fewer, larger ones. In some systems, system performance can be optimized for fewer, larger files. When some existing systems encounter many smaller files, those systems may have to open and close connections for each file, leading to significant overhead and computing resource usage. Compaction control types can be provided to groups, which allow the deployment of compaction processes on data sets in a streamlined and consistent manner. Thus, the solutions described herein can increase the amount of compaction processes that can be deployed to a data lake. Accordingly, the systems and methods described herein can result in using fewer computing resources to access files in a data lake. As used herein, the term "computing resource" can refer to a physical or virtual component of limited availability within a computer system. Computing resources can include, but are not limited to, computer processors, processor cycles, and/or memory.

Turning to FIG. 1, an illustrative network environment 100 for federated execution of process in a data lake is depicted. The components of the network environment 100 can enable standardized management and execution of processes on data sets. In particular, the components of the network environment 100 can enable the automatic carrying forward enabled processes from one data set version to the next data set version. Moreover, the components of the network environment 100 can enable automatic, programmatic adaptation of process behavior in response to data set state changes. Further, the foregoing improvements can be represented in a control stored in a catalog object in the data catalog, thereby making completeness, security, privacy, compliance, and/or data quality more transparent and consistent across different groups. The network environment 100 may include a data lake 130, one or more data sources 126, an ingestion system 128, a user computing device 102, a workflow system 122, an on-demand code execution system 124, and a catalog and control system 104.

The data lake 130 can include a centralized repository that stores the data sets 132. The data sets 132 can include structured and/or unstructured data. The data sets 132 can include, but are not limited to, a table or a binary object. The data sets 132 in the data lake 130 can be relational and non-relational. The data lake 130 can include a data catalog 112. The data catalog 112 can provide an interface to query assets (including data sets) stored in the data lake 130. The data catalog 112 can provide metadata and data management and search tools for data in the data lake 130. An ingestion system 128 can ingest data from the one or more data sources 126 and store the data in the data sets 132 in the data lake 130. Various different groups, which can refer to teams, data producers, and/or data management processes, can store data in the same data lake 130. Data stored in the data lake 130 can typically be stored in a raw format. However, in some cases, different groups can extract, transform, and load data into the data lake 130.

The workflow system 122 can process data sets from the data lake 130. The workflow system 122 can enable process automation, which includes the ability to build distributed applications and orchestrate microservices. The workflow system 122 can be coupled with an on-demand code execution system 124 that enables rapid execution of code, which may be supplied by groups using the workflow system 122 and the on-demand code execution system 124. As described herein, the workflow system 122 and the on-demand code execution system 124 may be implemented in a serverless environment. In serverless or cloud computing environments, responsibility for managing generation, configuration, and state of an underlying execution environment may be abstracted away from a group. In the network environment 100, a group need not create an execution environment, install an operating system, and/or manage a state of the environment in order to execute desired code in the environment.

The catalog and control system 104 can include a control service 110 and a catalog service 120. The catalog service 120 can create and manage control objects stored in the data catalog 112. The catalog service 120 can be accessed via a graphical user interface, command-line interface, or an API. For example, a user using a user computing device 102 can create, update, or delete a control object via a graphical user interface or command-line interface and the catalog service 120. The user computing devices 102 can include, but are not limited to, a laptop or tablet computer, personal computer, personal digital assistant (PDA), hybrid PDA/mobile phone, mobile phone, and/or a smartphone. The catalog service 120 can receive events on the data sets 132 for further processing. The control service 110 can access the control objects and receive events (such as data set or control state changes) that cause the control service 110 to schedule workflows and/or on-demand code executions via the workflow system 122 and the on-demand code execution system 124, respectively.

Control types and controls can be defined for any purpose related to the data sets 132 in the data lake 130. As described herein, control types and controls, can include, but are not limited to, processes for privacy, compliance, security, compaction, data sampling, data quality scans, etc. The data sets can change in state (such as, but not limited to, UNRELEASED, ACTIVE (also referred to as activated), PAUSED, DELETED, and DEPRECATED states) and a control type configuration can define how a control responds to a change in state for a data set. For example, a new control version can be assigned a new state (such as, but not limited to, UNRELEASED, ACTIVE, PAUSED, DELETED, or other states) in response to a data set state change. As described herein, the benefits of managing data lake processes with control types and controls include improved completeness, security, privacy, compliance, and/or data quality across different groups.

The network 106 may be any wired network, wireless network, or combination thereof. In addition, the network 106 may be a personal area network, local area network, wide area network, cable network, satellite network, cellular telephone network, or combination thereof. In addition, the network 106 may be an over-the-air broadcast network (e.g., for radio or television) or a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long-Term Evolution (LTE) network, or any other type of wireless network. The network 106 can use protocols and components for communicating via the Internet or any of the other aforementioned types of networks, such as HTTP, TCP/IP, and/or UDP/IP.

In some embodiments, the catalog and control system 104, the workflow system 122, the on-demand code execution system 124, and/or the data lake 130 can be implemented by one or more virtual machines implemented in a hosted computing environment. The hosted computing environment may include one or more rapidly provisioned and/or released computing resources. The computing resources may include hardware computing, networking and/or storage devices configured with specifically configured computer executable instructions. A hosted computing environment may also be referred to as a "serverless," "cloud," or "distributed" computing environment.

Figure 2:
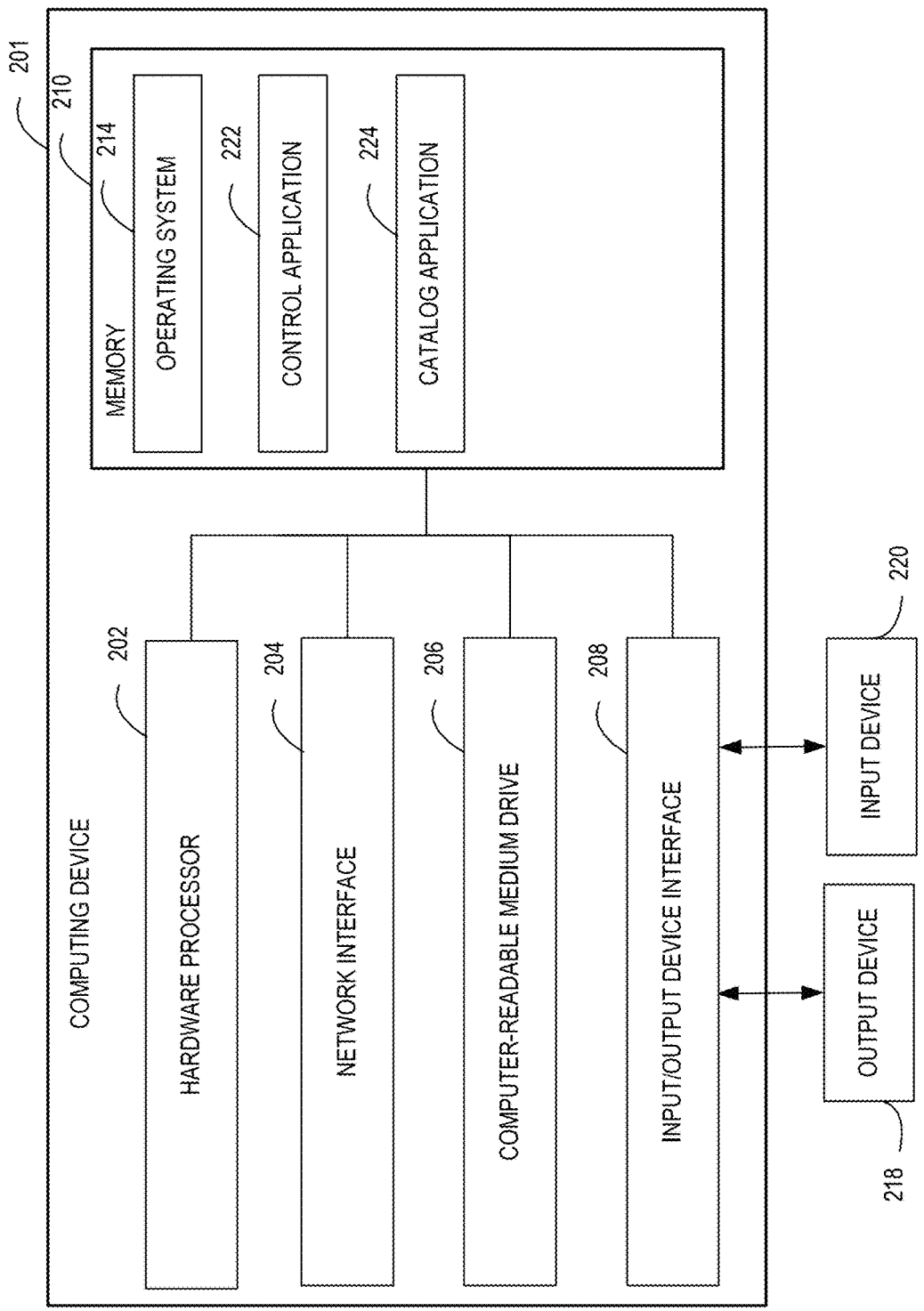
FIG. 2 is a schematic block diagram depicting an illustrative general architecture of a computing device.

FIG. 2 is a schematic diagram of an illustrative general architecture of a computing device 201 for implementing aspects of the catalog and control system 104 referenced in the environment 100 in FIG. 1. As described herein, the catalog and control system 104 can enable the standardized management and execution of processes on data sets in a data lake via controls. The computing device 201 includes an arrangement of computer hardware and software components that may be used to execute the control application 222 and/or the catalog application 224. The general architecture of FIG. 2 can be used to implement other devices described herein. The computing device 201 may include more (or fewer) components than those shown in FIG. 2. Further, other computing systems described herein may include similar implementation arrangements of computer hardware and/or software components.

The computing device 201 for implementing aspects of the catalog and control system 104 may include a hardware processor 202, a network interface 204, a non-transitory computer-readable medium drive 206, and an input/output device interface 208, all of which may communicate with one another by way of a communication bus. As illustrated, the computing device 201 is associated with, or in communication with, an output device 218 and an input device 220. The network interface 204 may provide the computing device 201 with connectivity to one or more networks or computing systems. The hardware processor 202 may thus receive information and instructions from other computing systems or services via the network 106. The hardware processor 202 may also communicate to and from memory 210 and further provide output information (such as audio data) for the output device 218, such as a speaker, via the input/output device interface 208. The input/output device interface 208 may accept input from the input device 220, such as a microphone, video camera, keyboard, mouse, digital pen, and/or touch screen.

The memory 210 may contain specifically configured computer program instructions that can be executed by the hardware processor 202. The memory 210 generally includes RAM, ROM and/or other persistent or non-transitory computer-readable storage media. The memory 210 may store an operating system 214 that provides computer program instructions for use by the hardware processor 202 in the general administration and operation of the computing device 201.

The memory 210 may include the control application 222 and/or the catalog application 224 that may be executed by the hardware processor 202. In some embodiments, the control application 222 and/or the catalog application 224 may implement various aspects of the present disclosure. The catalog application 224 can receive and process requests to create and update control objects. The catalog application 224 can receive data set state events. The control application 222 can access the control objects and process the events. In particular, the control application 222 can process the events and, according to the particular control object/control type, schedule and/or initiate workflows and/or on-demand executions that carry out the processes represented by the control object. As described herein, the processes under a control object can be for any purpose, such as, but not limited to, maintaining privacy, security, compliance, compaction, data sampling, data quality scans, etc.

A control object representation can be shown in Table 1 below. The control of Table 1 can be for a particular group (here Group 1). For example, the group could be an implementation of a privacy control. The control definition in Table 1 can be in a particular data format, such as, but no limited to, a JavaScript Object Notation (JSON) format and/or an Amazon™ Ion data format. The Ion data format can include a richly typed, self-describing, hierarchical data serialization format offering interchangeable binary and text representations. As shown in Table 1, line 7, the control can be associated with an identifier that refers to the control catalog object. As shown in Table 1, line 8, the control can be associated with a control type (here "ControlType/Group1/version/1"). As shown in Table 1, line 11, the control can be associated with a data set (here the "tables/d/versions/1") and a data set version. As shown in Table 1, lines 11-12, the control can be associated with a current state (here UNRELEASED) and a transition state (here ACTIVE) that indicates that the control is in transition to another state. As used herein, "lifecycle state" and "state" can be used interchangeably. The control can be associated with additional properties, such as, but not limited to, a particular executing engine, a service account, and a database query (see lines 19, 20, and 21 of Table 1). While not shown, the control can be associated with additional, specific properties as indicated by the ellipses at lines 13 and 23 of Table 1, such as a schedule for the control.

```
1 ObjectType: Control:Group1
2     RequiredProperties:    [ControlBaseProperties,
    Group1Properties]
3
4 #"required properties" returned by getObject API
5 'ControlBaseProperties'::{
6 $name: ControlBaseProperties,
7 $resourceName: tables/d/versions/1a/controls/Group1/
    version/1,
8 controlTypeResourceName: "ControlType/Group1/ver-
    sion/1",
9 lifecycleState: "UNRELEASED",
10 toLifecycleState: "ACTIVE",
11 sourceDataset VersionResourceName: "tables/d/ver-
    sions/1",
12
13 $systemMetadata: { . . . }
14}
16 #"required properties" returned by getObject API
17 'Group1Properties'::{
18 # other user defined properties
19 engineAccountId: "group1-core",
20 serviceAccountId: "123456",
21 sqlQuery: "select id from D",
22
23 $systemMetadata: { . . . }
24}
```

Table 1

As described herein, a control can be associated with a control type. A control type representation can be shown in Table 2 below. The control type representation in Table 2 can be the control type of the control of Table 1. As shown in Table 2, line 11, a control type definition can define a map relating a data set version state to a control state. The control service 110 can use the definition to put a control to a respective state for the data set version state. For example, when a data set is ACTIVE a new control can be put to ACTIVE (Table 2, line 11). As another example, when a data set is UNRELEASED a new control can be put to ACTIVE (which is not shown in Table 2).

```
1 ObjectType: ControlType:Group1
2 RequiredProperties: [ControlTypeProperties]
3
4 #"required properties" returned by getObject API
5 'ControlTypeProperties'::{
6 $name: ControlTypeProperties,
7 $resourceName: objectType/ControlType/version/1,
8 name: "Group1ControlType",
9 description: "Group 1 control type",
10 versionNumber: 1,
11    Dataset    VersionLifecycleToControlLifecycle:
    {{"ACTIVE", "ACTIVE"}},
```

12 # Dataset version lifecycle state vs control lifecycle
    state
13 $systemMetadata: { ... }
14}

Table 2

Figure 3A:
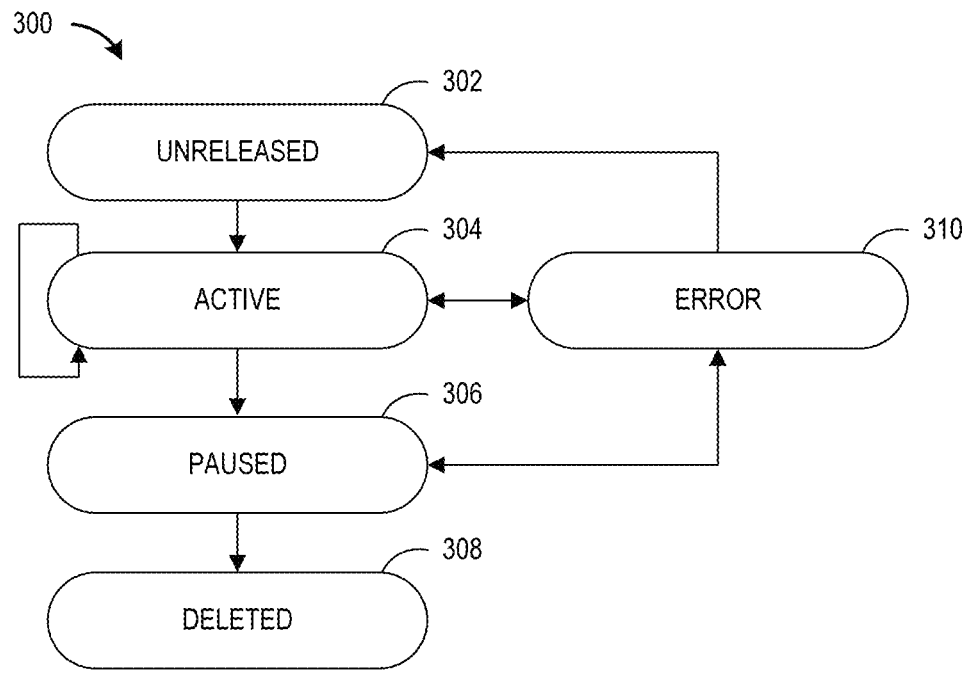
FIG. 3A depicts a state machine for permissible state transitions for controls.

FIGS. 3A-3C depict control states, data set states, and the relationship between data set states and control states. With existing systems and existing data lake technology, configuring the processes that operate on a data set and data set state changes is a one-off and technically challenging process. As described herein, an advantage of the catalog and control system 104, control types, and controls, is that the available states for a particular control can be defined and the transition states for the control can also be defined in response to the state changes of a data set. Thus, the systems and methods described herein can improve data set processes configuration.

In FIG. 3A, the state machine 300 is depicted for permissible state transitions for new versions of controls. The state machine 300 can include the states: UNRELEASED state 302, ACTIVE state 304, PAUSED state 306, DELETED state 308, and ERROR state 310. The UNRELEASED state can indicate that a new control has been created and has not been released yet. A control operator can continue to configure the control. The ACTIVE state can indicate that the control service 110 has scheduled respective process(es) for execution on a particular data set version. The PAUSED state can indicate that the control service 110 has paused execution of a process. The DELETED state can indicate that the control service 110 has turned off the schedule for the control and all control related resources have been deleted. In the DELETED state, the control object may no longer be discoverable anymore. The ERROR state can indicate that the control failed to transition from one state to another.

As shown by the state machine 300, a control can transition from the UNRELEASED state 302 to the ACTIVE state 304. The control can transition from the ACTIVE state 304 to the ACTIVE state 304. The control can transition from the ACTIVE state 304 to the ERROR state 310 and vice versa. The control can transition from the ERROR state 310 to the UNRELEASED state 302. The control can transition from the ACTIVE state 304 to the PAUSED state 306. The control can transition from the PAUSED state 306 to the ERROR state 310 and vice versa. The control can transition from the PAUSED state 306 to the DELETE state 308. As described herein, a control transitioning from a first state to a different second state can be implemented with a previous version of the control set to the first state being followed by a subsequent version of the control set to the second state.

FIGS. 3B-3C depict the configurability of data set controls with respect to changes in data set state. Each of the shown dataset-control matrices 312, 314, 316, 318 can represent the allowable states of a control in response to a data set state change where each respective dataset-control matrices 312, 314, 316, 318 can be associated with a particular control type and control. As described herein, the control type can define a map containing data set version state to control state, which are represented by the dataset-control matrices 312, 314, 316, 318. The control types and the dataset-control matrices 312, 314, 316, 318 can represent respective state machines for automatic state transitions for a control with respect to data set state. In FIG. 3B, the first matrix 312 and the second matrix 314 can each be associated with privacy controls that are executed against a data set. The first matrix 312 can be associated with a first control for a first group and the second matrix 312 can be associated with a second control for a second group.

In the first matrix 312, column A represents possible data set states for the group control (here UNRELEASED, ACTIVE, DEPRECATED, ARCHIVED, and DELETED). The paired elements in Column A and Column B in the same row represent the state change of the control in response to the corresponding data set state in that row. For example, in the first matrix 312, the cell 2B can indicate that if the data set for the first control is in the UNRELEASED state, then the first control should be changed to the ACTIVE state if the data set owner approves.

The paired elements in Column A and Column C in the same row represent the state change of the control in response to the corresponding data set state in that row and a data set version upgrade. For example, in the first matrix 312, the cell 3C can indicate that if the data set for the first control is in the ACTIVE state and there is a data set version upgrade (such as a schema upgrade that is not backwards compatible), then the version of the first control should be updated and the new control version should be copied from the prior active version of the control. Moreover, the cell 3C can indicate that the new version of the control can execute on previous versions of data sets (such as data sets that are in a DEPRECTATED state). In contrast, in the second matrix 314, the cell 3C can indicate that if the data set for the second control is in the ACTIVE state and there is a data set version upgrade (such as a schema upgrade that is not backwards compatible), then the version of the first control should be updated and the new control version only should be applied to the latest data set with an ACTIVE state.

The paired elements in Column A and Column D in the same row represent the state change of the control in response to the corresponding data set state in that row and a data set revision upgrade. A data set revision upgrade can include a backwards compatible change to a data set, such as adding a new column that is not a key to the data set. For example, in the first matrix 312, the cell 4D can indicate that if the data set for the first control is in the DEPRECATED state and there is a data set revision upgrade, then the version of the first control does not need a change unless a key or customer_id field is changing. As shown in the first matrix 312, if the data set is archived then the first control is automatically paused and if the data set is deleted then the first control is automatically deleted.

The second matrix 314 can be similar to the first matrix 312. However, the second matrix 314 can be for a completely separate control, the second control and second group. As just one example, in contrast to cell 2B of the first matrix 312 where the first control is ACTIVE based on a data set owner decision, the cell 2B of the second matrix 314 can indicate that if the data set for the second control is in the UNRELEASED state, then the second control should automatically change or remain in the UNRELEASED state. In FIG. 3C, the third matrix 316 and the fourth matrix 318 can also be similar to the first matrix 312 of FIG. 3B, but with difference as well. Accordingly, the dataset-control matrices 312, 314, 316, 318 can represent the highly standardized and highly configurable nature of the control approach offered by the systems and methods described herein.

In FIG. 3C, the third matrix 316 can be associated with a compaction control that is executed against a data set and the third matrix 316 can be associated with a third group. In contrast to cell 2D of the first matrix 312 where the first control does not change unless a key column is changing with a DEPRECATED data set, the cell 2D of the third matrix 316 can indicate that if the data set for the third control is in the UNRELEASED state and there is a data revision upgrade, then the third control should change to or remain in the ACTIVE state. The fourth matrix 318 can be associated with a data sampling control that is executed against a data set and the fourth matrix 318 can be associated with a fourth group.

Figure 4:
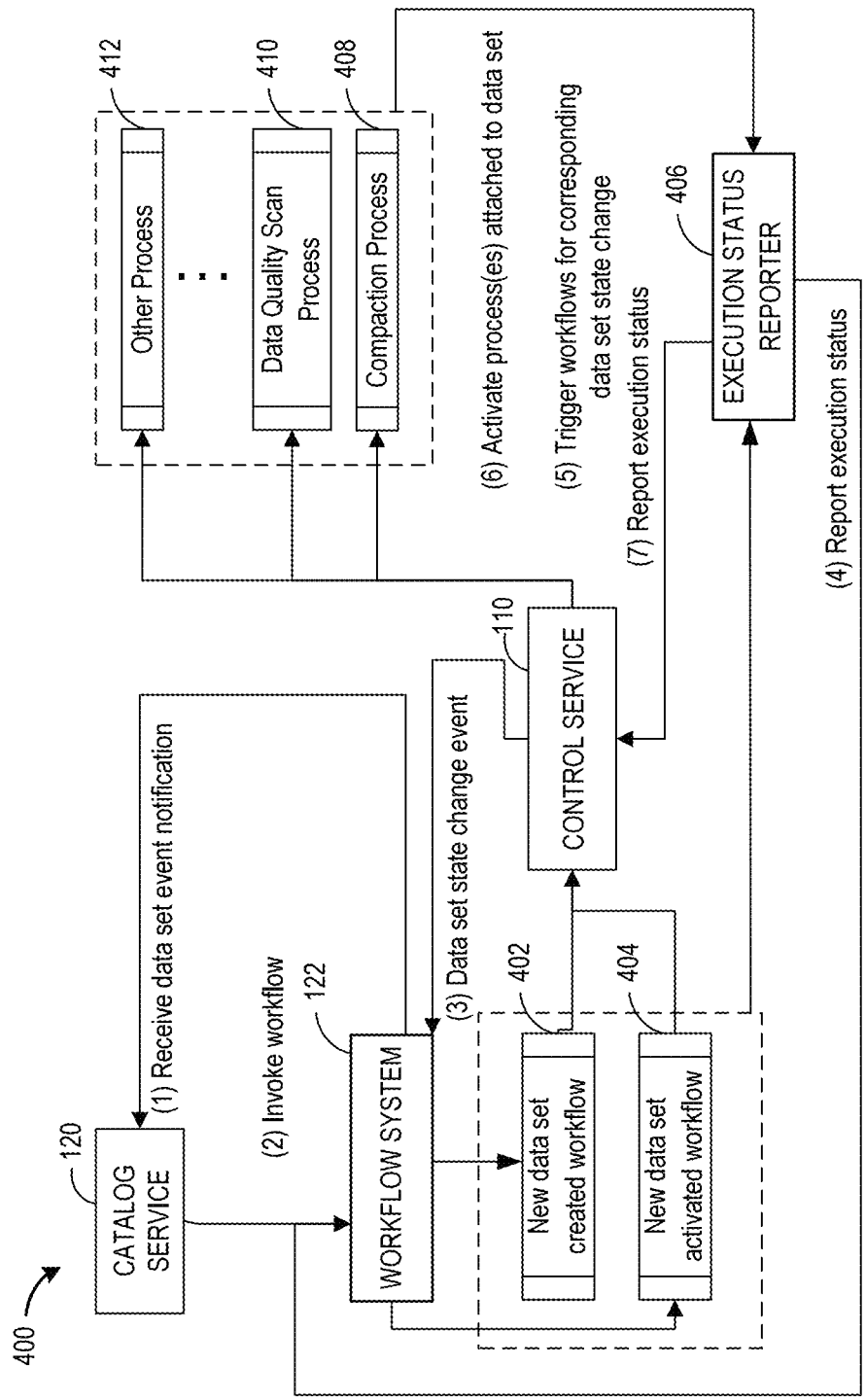
FIG. 4 is a flow diagram depicting illustrative interactions in a data lake for federated execution of processes on data sets.

FIG. 4 depicts a flow diagram 400 depicting interactions in the data lake 130 for federated execution of processes on data sets. As described herein, the catalog and control system 104 can enable the standardized execution of processes on data sets in the data lake 130 with various state changes. The flow diagram 400 can depict how the various components of the network environment 100 can implement aspects of the catalog and control system 104 to enable the standardized execution of processes on data sets.

At one (1), the catalog service 120 can receive a data set event notification. As described herein, the catalog service 120 can provide objects that are available in the data lake 130. Moreover, when a data set is created (such as a new table version) the catalog service 120 can receive a notification of the creation. Similarly, when a data set is activated the catalog service 120 can receive a notification of the activation. At two (2), the catalog service 120 can, via the workflow system 122, invoke one or more workflows associated with the event notification. At three (3), the workflow system 122 can execute some workflow(s) associated with the data set state change event (such as the data set state changing to UNRELEASED, ACTIVE, etc.). For example, if a data set is created, the workflow system 122 can invoke the new data set created workflow 402. If a data set is activated, the workflow system 122 can invoke the new data set activated workflow 404. During the workflow invocations, the workflow system 122 can invoke code instructions via the on-demand code execution system 124 based on the instructions for the respective workflow. At four (4), the execution status report 406 can report the status of the executed workflows to the workflow system 122, which can in turn report the execution status to the catalog service 120.

At five (5), the control service 110 can trigger additional workflows for the corresponding data set state change based on the respective control definition. The workflow system 122 can execute workflow(s) associated with the data set state change event and for the particular control associated with the data set. At six (6), the workflow system 122 can activate the process(es) associated with the data set as defined by the control. As shown, the workflow system 122 can cause a compaction process 408, a data quality scan process 410, or any other process 412 associated with the data set. The compaction process 408 can include scheduling a start time for the compaction job, initializing the compaction job, creating a compacted data set (which can include combining multiple data sets) at the start time, and replacing the previous data sets with the new compacted copy of the data set. The data quality scan process 410 can include scheduling a start time for the data quality scan job, initializing the data quality scan job, and executing the data quality scan job. As described herein, the workflow system 122 can invoke code instructions via the on-demand code execution system 124 based on the instructions for the particular process 408, 410, 412. At seven (7), the execution status report 406 can report the status of the executed workflows to the control service 110. The control service 110 can report the execution status to the workflow system 122, which can in turn report the execution status to the catalog service 120.

Figure 5:
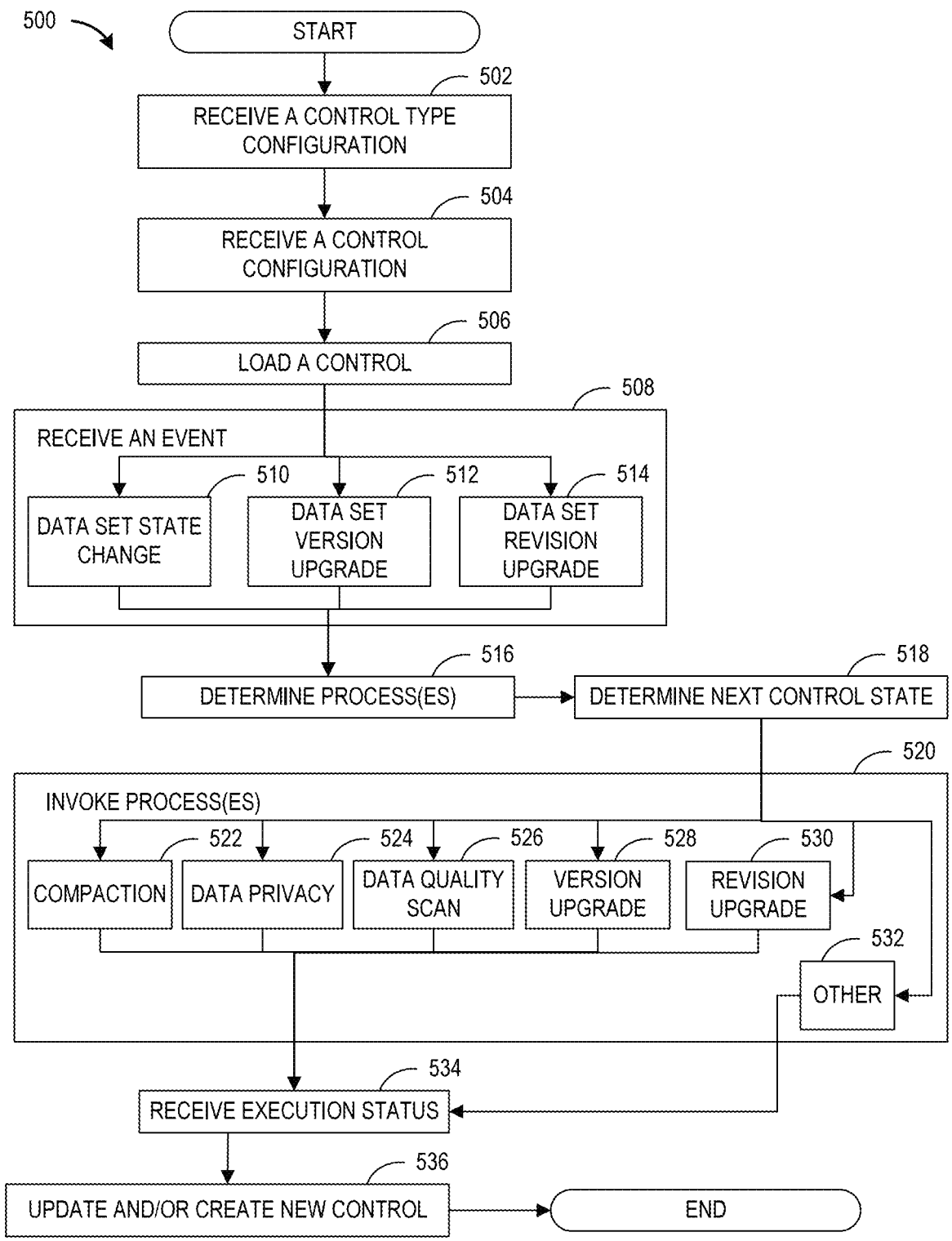
FIG. 5 is a flow chart depicting a method implemented by the catalog and control system for federated execution of processes on data sets based on controls.

FIG. 5 includes a flow chart depicting a computer-implemented method 500 for federated execution of processes on data sets based on controls. The method 500 can enable the standardized execution of processes on data sets taking into consideration the state changes of a data set. A control type can define the available states for a particular control and the transition states for the control can also be defined in response to the state changes of a data set. The method 500 can improve data set processes configuration and data set processes execution.

As described herein, the catalog and control system 104, which includes the control service 110 and the catalog service 120, may be implemented with the computing device 201 of FIG. 2. In some embodiments, the computing device 201 may include the control application 222 and/or the catalog application 224 each of which may implement aspects of the method 500. Some aspects of the method 500 may be implemented by the workflow system and/or the on-demand code execution system. Moreover, some aspects of the method 500 may be described above with respect to FIG. 4.

Beginning at block 502, a control type configuration can be received. The catalog service 120 can receive the control type configuration. The catalog service 120 can receive a definition mapping data set states to control states for the control type. For example, the definition can map from an activated state for the data set to an activated state for the control object. Moreover, the definition can map a data set version upgrade to a version upgrade state for the control object; the definition can map a data set revision upgrade to a revision upgrade state for control object. Additional details regarding state mapping are described herein, such as with respect to FIGS. 3A, 3B, and 3C. Control type configurations can be properties. In some embodiments, a control type can have a version number and/or a revision number. The control type configuration can be for a new control type or an update to an existing control type. Additional details regarding control types are described herein, such as with respect to Table 2. The control type configuration can be received via a graphical user interface, a command-line interface, or an API. The catalog service 120 can create the control type with the definition mapping in the data catalog 112. A client, via the catalog service 120, can modify a created control type.

At block 504, a control configuration can be received 502. The catalog service 120 can receive the control configuration. A control configuration can include the properties of a control, such as, but not limited to, the data set associated with the control, the control type associated with the control, a current control state, a next control state, processes for execution, etc. In some embodiments, a control can have a version number and/or a revision number. The control configuration can be for a new control or an update to an existing control. Additional details regarding controls are described herein, such as with respect to Table 1. The control configuration can be received via a graphical user interface, a command-line interface, or an API. The catalog service 120 can create the control with one or more properties in the data catalog 112. A client, via the catalog service 120, can modify a created control.

At block 506, a control can be loaded. The control service 110 and/or the catalog service 120 can load a control. As described herein, a control can have multiple properties, including a control type, which itself can have yet further properties. Accordingly, the control service 110 and/or the catalog service 120 can determine what operations to perform next based on events received and the loaded properties. An advantage to a data catalog approach to controls is that multiple, different controls and control types can be supported. For example, a second control can be different from a first control based at least in part on differing control types and a second control type can have a different definitions (such as a definition mapping an unreleased state for the data set to an activated state for the control object) than a first control type.

At block 508, an event can be received. The catalog service 120 can receive the event for a data set. The catalog service 120 can process different event types. The block 508 for receiving an event can include the blocks 510, 512, 514 for determining a data set change, a data set version upgrade, and/or a data set revision upgrade event. At block 510, the catalog service 120 can receive a data set state change event. The data set change can include the data set changing to one of the non-limiting, following states: unreleased, activated, deprecated, archived, or deleted. At block 512, the catalog service 120 can receive a data set version upgrade. As described herein, a version upgrade to a data set can be an upgrade, such as a schema change, that may not be backwards compatible. At block 514, the catalog service 120 can receive a data set revision upgrade. As described herein, a revision upgrade to a data set can be an upgrade that can be backwards compatible.

At block 516, one or more processes can be determined. The control service 110 can determine a corresponding process based at least in part on the properties for the control. For example, the control service 110 can determine, from a property of the control object, a process to invoke on the data set. In some embodiments, the control service 110 can determine, from a property of the control object and a state (such as an activated state) for the control object, a process to invoke on the data set. As described herein, the process can be invoked by the workflow system 122 and/or the on-demand code execution system 124.

At block 518, a next state for the control can be determined. The control service 110 can determine the next state for the control. The control service 110 can determine a next state from the received event (such as a state of the data set), a current state of the control object, and the definition mapping data set states to control states. The definition can map a first state for the data set to a second state for the control object. For example, the control service 110 can determine that the control object should change to an activated state based on the foregoing information. The control service 110, as defined by control properties, can also apply additional logic to the next state determination, such as, but not limited to, determining a data set owner decision to activate the control object. As another example, in some configurations, such as a revision upgrade mapping, the control service 110 can determine that a revision for a control should be created where the service 110 determines a change to a key column (or some other specific column) for the data set. The control service 110 can determine, from a version upgrade event, a current state of the control object, and a definition from the control type, that a subsequent version of the control object should be created. In some configurations, the control service 110 can determine, from a revision upgrade event, a current state of the control object, and a second definition from the control type, to not change the control object. Additional details regarding mapping states are described herein, such as with respect to FIGS. 3B-3C and Table 2.

At block 520, a process can be invoked. The workflow system 122 and/or the on-demand code execution system 124 can invoke the process on the data set. The block 520 for invoking a process can include the blocks 522, 524, 526, 528, 530, 532 for different types of processes. At block 522, a compaction process can be executed. The workflow system 122 and/or the on-demand code execution system 124 can execute combining a first data set and a second data set into a compacted data set; and replacing the first data set and the second data set with the compacted data set. As described herein, a compacted data set can be a larger file than the individual component data sets, which can save computing resources by reducing the overhead of loading one large file instead of multiple smaller files. With respect to the blocks 524, 526, the workflow system 122 and/or the on-demand code execution system 124 can execute data privacy processes and/or data quality scan processes, respectively. At block 528, a version upgrade process can be executed. The workflow system 122 and/or the on-demand code execution system 124 can copy properties from the current version of the control object to a new version of the control object, and create a new property for the new version of the control object based at least in part on the data set version upgrade. At block 530, a revision upgrade process can be executed. The workflow system 122 and/or the on-demand code execution system 124 can create a new property in a revision version based at least in part on the change to the key column for the data set. The workflow system 122 and/or the on-demand code execution system 124 can execute other processes 532, such as, but not limited to, a data sampling process.

At block 534, an execution status of the process can be received. The control service 110 can receive the status of the process execution. Status types can include a successful execution or an error execution. At block 536, a control can be updated and/or a new control can be created. In some embodiments, the catalog service 120 can create an updated control object (a subsequent version of the control object) with the updated state. The catalog service 120 can also write the execution status for the executed process to the updated control object. New control objects can have an updated state, such as, but not limited to, an activated state, a deleted state, a paused state, etc. Additional details regarding state changes are described herein, such as with respect to FIGS. 3A, 3B, 3C. Additionally or alternatively, the catalog service 120 can write the execution status for the executed process to the previous control object. The catalog service 120 can store the updated control object (which can include a new version and/or revision) to the data catalog 112.

While a data lake is used as a common example herein, the systems and methods described herein can also be applied to a data warehouse context. For example, control types and controls could be stored in the data warehouse and used to control processes that operate on data in the data warehouse.

Not necessarily all objects or advantages may be achieved in accordance with any particular embodiment described herein. Thus, certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computer hardware processors. The code modules (including computer-executable instructions) may be stored in any type of non-transitory computer-readable storage medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, and/or elements. Thus, such conditional language is not generally intended to imply that features, and/or elements are in any way required for one or more embodiments or that one or more embodiments necessarily include logic for deciding, with or without user input or prompting, whether these features, and/or elements are included or are to be performed in any particular embodiment. The terms "comprising," "including," "having," and the like are synonymous and are used inclusively, in an open-ended fashion, and do not exclude additional elements, features, acts, operations, and so forth. Further, the term "each," as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
receiving a first control object associated with a first control type,
wherein the first control object is associated with a first data set, and
wherein the first control type comprises a first definition mapping an activated state for the first data set to an activated state for the first control object;
receiving a first state event for the first data set;
determining, from the first state event, a current state of the first control object, and the first definition from the first control type, that the first control object should change to the activated state, wherein determining that the first control object should change state comprises:
determining a data set owner decision to activate the first control object;
determining, from a first property of the first control object and the activated state for the first control object, a first process to invoke on the first data set;
invoking, via a workflow system, the first process on the first data set;
receiving an execution status for the first process;
creating an updated first control object with the activated state; and
writing the execution status for the first process to the updated first control object.

2. The computer-implemented method of claim 1, further comprising:
receiving a second control object associated with a second control type,
wherein the second control object is associated with a second data set, and wherein the second control type comprises a second definition mapping an unreleased state for the second data set to an activated state for the second control object;

receiving a second state event for the second data set;

determining, from the second state event, a current state of the second control object, and the second definition from the second control type, that the second control object should change to the activated state;

determining, from a second property of the second control object and the activated state for the second control object, a second process to invoke on the second data set; and invoking, via the workflow system, the second process on the second data set.

3. The computer-implemented method of claim 1, further comprising:

receiving, via a graphical user interface, the first definition for the first control type; and creating, in a data catalog, the first control type with the first definition.

4. The computer-implemented method of claim 1, further comprising:

receiving, via a graphical user interface, the first property for the first control object; and creating, in a data catalog, the first control object with the first property.

5. The computer-implemented method of claim 1, wherein the first process corresponds to a compaction process, and wherein invoking the first process further comprises:

combining the first data set and a second data set into a compacted data set; and replacing the first data set and the second data set with the compacted data set.

6. The computer-implemented method of claim 1, wherein the first process corresponds to at least one of a data quality scan process or a data privacy process.

7. A system comprising:

a first non-transitory data storage medium to store a first data set; and a computing device comprising:
    a non-transitory data storage medium to store computer-executable instructions; and
    a computer hardware processor in communication with the non-transitory data storage medium, wherein the computer hardware processor executes the computer-executable instructions to at least:
        receive a first control object associated with a first control type,
            wherein the first control object is associated with the first data set, and
            wherein the first control type comprises a first definition mapping a first state for the first data set to a second state for the first control object;
        receive a first state event for the first data set;
        determine, from the first state event, a first current state of the first control object, and the first definition from the first control type, that the first control object should change to the second state;
        determine, from a property of the first control object and the second state for the first control object, a first process to invoke on the first data set;
        invoke, via a workflow system, the first process on the first data set;
        receive an execution status for the first process; and
        write the execution status for the first process to an updated first control object.

8. The system of claim 7, wherein the first control type further comprises a second definition mapping a data set version upgrade to a version upgrade state for the first control object, wherein the computer hardware processor executes additional computer-executable instructions to at least:

receive a version upgrade event for the first data set;

determine, from the version upgrade event, a second current state of the first control object, and the second definition from the first control type, that a subsequent version of the first control object should be created, wherein to determine that the subsequent version of the first control object should be created, the computer hardware processor executes additional computer-executable instructions to at least:
    determine a data set owner decision to create the subsequent version of the first control object;

create the subsequent version of the first control object, wherein to create the subsequent version, the computer hardware processor executes additional computer-executable instructions to at least:
    copy properties from the first control object; and
    create a new property based at least in part on the data set version upgrade;

store, in a data catalog, the subsequent version of the first control object.

9. The system of claim 7, wherein the first control type further comprises a second definition mapping a data set revision upgrade to a revision upgrade state for the first control object, wherein the computer hardware processor executes additional computer-executable instructions to at least:

receive a revision upgrade event for the first data set; and determine, from the revision upgrade event, a second current state of the first control object, and the second definition from the first control type, to not change the first control object.

10. The system of claim 7, wherein the first control type further comprises a second definition mapping a data set revision upgrade to a revision upgrade state for the first control object, wherein the computer hardware processor executes additional computer-executable instructions to at least:

receive a revision upgrade event for the first data set;

determine, from the revision upgrade event, a second current state of the first control object, and the second definition from the first control type, that a subsequent revision of the first control object should be created, wherein to determine that the subsequent revision of the first control object should be created, the computer hardware processor executes additional computer-executable instructions to at least:
    determine a change to a key column for the first data set;

create the subsequent revision of the first control object, wherein to create the subsequent revision, the computer hardware processor executes additional computer-executable instructions to at least:
    create a new property based at least in part on the change to the key column for the first data set; and store, in a data catalog, the subsequent revision of the first control object.

11. The system of claim 7, wherein the first state for the first data set is a deprecated state and the second state for the first control object is an activated state.

12. The system of claim 7, wherein the first control type further comprises a second definition mapping an archived state for the first data set to a paused state for the first control object, wherein the computer hardware processor executes additional computer-executable instructions to at least:
  receive a second state event for the first data set;
  determine, from the second state event, a second current state of the first control object, and the second definition from the first control type, that the first data set is set to the archived state and the first control object should change to the paused state; and
  cause an updated first control object to change to the paused state.

13. The system of claim 7, wherein the first control type further comprises a second definition mapping a deleted state for the first data set to a deleted state for the first control object, wherein the computer hardware processor executes additional computer-executable instructions to at least:
  receive a second state event for the first data set;
  determine, from the second state event, a second current state of the first control object, and the second definition from the first control type, that the first data set is set to the deleted state and the first control object should change to the deleted state; and
  cause an updated first control object to change to the deleted state.

14. A system comprising:
  a first non-transitory data storage medium to store a first data set; and
  a computing device comprising:
    a non-transitory data storage medium to store computer-executable instructions; and
    a computer hardware processor in communication with the non-transitory data storage medium, wherein the computer hardware processor executes the computer-executable instructions to at least:
      receive a first control object associated with a first control type,
        wherein the first control object is associated with the first data set, and
        wherein the first control type comprises a definition mapping a first state for the first data set to a second state for the first control object;
      receive a first state event for the first data set;
      determine, from the first state event, a current state of the first control object, and the definition from the first control type, that the first control object should change to the second state;
      determine, from a property of the first control object and the second state for the first control object, a first process to invoke on the first data set; and
      invoke, via a workflow system, the first process on the first data set.

15. The system of claim 14, wherein the first control type further comprises a second definition mapping a data set version upgrade to a version upgrade state for the first control object, wherein the computer hardware processor executes additional computer-executable instructions to at least:
  receive a version upgrade event for the first data set;
  determine, from the version upgrade event, a second current state of the first control object, and the second definition from the first control type, that a subsequent version of the first control object should be created,
  wherein to determine that the subsequent version of the first control object should be created, the computer hardware processor executes additional computer-executable instructions to at least:
    determine a data set owner decision to create the subsequent version of the first control object;
  create the subsequent version of the first control object, wherein to create the subsequent version, the computer hardware processor executes additional computer-executable instructions to at least:
    copy properties from the first control object; and
    create a new property based at least in part on the data set version upgrade;
  store, in a data catalog, the subsequent version of the first control object.

16. The system of claim 14, wherein the first control type further comprises a second definition mapping a data set revision upgrade to a revision upgrade state for the first control object, wherein the computer hardware processor executes additional computer-executable instructions to at least:
  receive a revision upgrade event for the first data set; and
  determine, from the revision upgrade event, a second current state of the first control object, and the second definition from the first control type, to not change the first control object.

17. The system of claim 14, wherein the first control type further comprises a second definition mapping a data set revision upgrade to a revision upgrade state for the first control object, wherein the computer hardware processor executes additional computer-executable instructions to at least:
  receive a revision upgrade event for the first data set;
  determine, from the revision upgrade event, a second current state of the first control object, and the second definition from the first control type, that a subsequent revision of the first control object should be created,
  wherein to determine that the subsequent revision of the first control object should be created, the computer hardware processor executes additional computer-executable instructions to at least:
    determine a change to a key column for the first data set;
  create the subsequent revision of the first control object, wherein to create the subsequent revision, the computer hardware processor executes additional computer-executable instructions to at least:
    create a new property based at least in part on the change to the key column for the first data set; and
  store, in a data catalog, the subsequent revision of the first control object.

18. The system of claim 14, wherein the first state for the first data set is a deprecated state and the second state for the first control object is an activated state.

19. The system of claim 14, wherein the first control type further comprises a second definition mapping an archived state for the first data set to a paused state for the first control object, wherein the computer hardware processor executes additional computer-executable instructions to at least:
  receive a second state event for the first data set;
  determine, from the second state event, a second current state of the first control object, and the second definition from the first control type, that the first data set is set to the archived state and the first control object should change to the paused state; and
  cause an updated first control object to change to the paused state.

20. The system of claim 14, wherein the first control type further comprises a second definition mapping a deleted state for the first data set to a deleted state for the first control object, wherein the computer hardware processor executes additional computer-executable instructions to at least:
- receive a second state event for the first data set;
- determine, from the second state event, a second current state of the first control object, and the second definition from the first control type, that the first data set is set to the deleted state and the first control object should change to the deleted state; and
- cause an updated first control object to change to the deleted state.

* * * * *